3,100,778
Patented Aug. 13, 1963

3,100,778
DERIVATIVES OF 1,3,3 TRIMETHYL-SPIRO
(2'H-1'-BENZOPYRAN-2,2'-INDOLENE)
Elliot Berman, East Braintree, Mass., assignor to The
National Cash Register Company, Dayton, Ohio, a
corporation of Maryland
No Drawing. Filed May 9, 1961, Ser. No. 108,710
6 Claims. (Cl. 260—319)

This invention relates to a compound of the structure

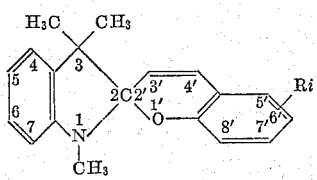

in which the R$i$ substituents are selected from a defined class so that the compound has a substantially colorless state, in which the 2'-1' bond is intact, and a distinctively colored state, in which the 2'-1' bond is broken, the colored state being produced, at will, by irradiating a solution of the compound with electromagnetic radiation having a preponderance of blue and ultra-violet components, and the colorless state being redeveloped, at will, by irradiating a solution of the compound with electromagnetic radiation having a preponderance of wave lengths longer than blue.

This is a continuation-in-part of United States patent application Serial No. 803,836, filed by Elliot Berman on April 3, 1959, now abandoned.

The claimed composition is unique not only in that the change in state may be brought about, repeatedly, in the temperature range of from plus 20 degrees centigrade to minus 20 degrees centigrade and below, by the specified electromagnetic radiation, but in that in many instances the composition is stable at least for several months, in solution, against change from one state to the other state by thermal activity thereof in that temperature range, in the absence of counteracting electromagnetic radiation.

By "solution," as used herein, is meant the homogeneous mixture of one or more of the compounds with a solid or liquid substance. The claimed compound, with the specified characteristics, behaves according to the energy contribution which the substituents R$i$ give to the parent compound, and such energy contributions can be calculated from known values in the position or positions which they occupy in the structure of the parent compound relative to the site of reaction, which site is at the mentioned 2'-1' bond.

According to the invention, a compound within the structure

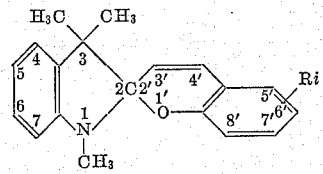

and, when dissolved in ethanol, satisfying the expression $$3.10992 \leq 3.41 \sum_{5' \leq q \leq 8'} \sigma(Ri, q) \leq 5.19343$$

where R$i$ represents one or more of the substituent radicals R listed in Table I, which follows; $q$ represents the substituent positions 5', 6', 7', and 8';

$$\sum_{5' \leq q \leq 8'} \sigma(Ri, q)$$

represents the sum of the substituent constant sigma values $\sigma$ of the R$i$ substituents attached to $q$ substituent positions, the appropriate values for said R$i$ substituents attached to said $q$ positions being selected from said Table I; and 3.41 is a proportionality constant which applies when the thermal stability of the R$i$ substituted compound is measured as an ethanol solution, has the desired characteristics, whereas compounds that do not satisfy the expression do not have the desired characteristics.

The substituent constant sigma values $\sigma$ are derived from the Hammett equation $\sigma = \log Ki - \log K_i^0$, in which K$i$ is the ionization constant for a substituted aromatic reactant and $K_i^0$ is the ionization constant for an unsubstituted aromatic reactant. More detailed information about substituent constants and the derivation and interpretation thereof may be obtained by reference to Hammett, Physical Organic Chemistry, First Edition, pages 186 to 205, McGraw-Hill Book Company, Incorporated, New York, N.Y., 1940; and to Hine, Physical Organic Chemistry, First Edition, pages 69 to 80, 1956, also published by McGraw-Hill Book Company.

TABLE I

*Substituent Constant Sigma Values* $= \sigma$

| R$i$ | Ring positions | | |
|---|---|---|---|
| | 8' | 5'; 7' | 6' |
| (1) $CH_3$ | −0.17 | −0.069 | −0.306 |
| (2) $CH_2CH_3$ | −0.16 | −0.0625 | −0.291 |
| (3) $CH(CH_3)_2$ | −0.15 | −0.0589 | −0.276 |
| (4) $C(CH_3)_3$ | −0.14 | −0.0581 | −0.250 |
| (5) $C_6H_5$ | 0.00 | +0.06 | −0.01 |
| (6) $CF_3$ | | +0.43 | +0.54 |
| (7) $CN$ | | +0.56 | +0.66 |
| (8) $COCH_3$ | | +0.376 | +0.502 |
| (9) $CO_2C_2H_5$ | | +0.37 | +0.45 |
| (10) $CO_2H$ | | +0.37 | +0.45 |
| (11) $NH_2$ | | −0.16 | −0.66 |
| (12) $NHCH_3$ | | | −0.84 |
| (13) $N(CH_3)_2$ | | | −0.83 |
| (14) $NHCOCH_3$ | | +0.21 | 0.0 |
| (15) $NO_2$ | +0.80 | +0.662 | +0.777 |
| (16) $OCH_3$ | −0.39 | +0.0465 | −0.764 |
| (17) $OC_2H_5$ | −0.35 | +0.1 | −0.24 |
| (18) $O(CH_2)_2CH_3$ | | +0.1 | −0.25 |
| (19) $O(C_6H_5)$ | | +0.252 | −0.32 |
| (20) $OH$ | | +0.121 | −0.37 |
| (21) $OCOCH_3$ | | +0.39 | +0.31 |
| (22) $SCH_3$ | | +0.15 | 0.0 |
| (23) $SH$ | | +0.25 | +0.15 |
| (24) $SOCH_3$ | | +0.39 | +0.44 |
| (25) $SCN$ | | | +0.52 |
| (26) $SOCH_3$ | | +0.52 | +0.49 |
| (27) $SO_2CH_3$ | | +0.60 | +0.72 |
| (28) $SO_2NH_2$ | | +0.46 | +0.57 |
| (29) $F$ | +0.24 | +0.337 | −0.0714 |
| (30) $Cl$ | +0.20 | +0.373 | +0.112 |
| (31) $Br$ | +0.21 | +0.391 | +0.148 |
| (32) $I$ | +0.21 | +0.352 | +0.132 |
| (33) $IO_2$ | | +0.70 | +0.76 |
| (34) $CH_2CH=CH_2$ | −0.16 | −0.0625 | −0.291 |
| (35) $CO_2CH_3$ | +0.45 | +0.37 | +0.45 |

A preferred class of such compounds includes phototropic compounds having the general structural formula:

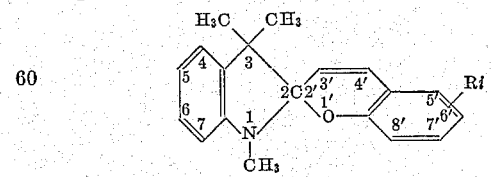

wherein R$i$ represents independently-selected substituent radicals in at least two of substituent positions 5', 6', 7', and 8', said substituent radicals being selected from the group consisting of —$NO_2$, —$OCH_3$, —Cl, —Br, —I, and —F, the substituents at said positions consisting of (a) at least one but no more than two —$NO_2$ groups and (b) at least one of the foregoing radicals other than the —$NO_2$ radical, the substituent radicals being so selected that the compound, when dissolved in ethanol, satisfies the expression:

$$3.10992 \leq 3.41 \sum_{5' \leq q \leq 8'} \sigma(Ri, q) \leq 5.19343$$

where $Ri$ represents the substituent radicals, $q$ stands for the substituent positions, and $$\sum_{5' \leq q \leq 8'} \sigma(Ri, q)$$

represents the sum of the substituent constant sigma values of said $Ri$ substituent radicals when attached to any one of positions 5', 6', 7', and 8', the sigma values of said substituents when attached at the different positions being as follows:

| Ri | 8' | 5':7' | 6' |
|---|---|---|---|
| —NO$_2$ | +0.80 | +0.662 | +0.777 |
| —OCH$_3$ | —0.39 | +0.0465 | —0.764 |
| —Cl | +0.20 | +0.373 | +0.112 |
| —Br | +0.21 | +0.391 | +0.148 |
| —I | +0.21 | +0.352 | +0.132 |
| —F | +0.24 | +0.337 | —0.0714 |

Any substituted spiro-pyran compound falling within the scope of the instant disclosure is suitable for the stated purposes. However, those compounds which are particularly suitable and which are thus especially preferred may be selected from the group consisting of (1) 1,3,3-trimethylindoline - 5',7'-dichloro-6'-nitrobenzopyrylospiran;
(2) 1,3,3-trimethylindolino-8'-methoxy-5',6'-dinitrobenzopyrylospiran;
(3) 1,3,3-trimethylindolino-8'-fluoro-6'-nitrobenzopyrylospiran;
(4) 1,3,3-trimethylindolino-8'-bromo-6'-nitrobenzopyrylospiran;
(5) 1,3,3 - trimethylindolino - 6',8'-chloro - 5'-nitrobenzopyrylospiran.

In preparing the above-mentioned especially preferred compounds (1) to (5), inclusive, the specific process to be described hereinafter for preparing the 5',7'-dichloro-6'-nitro derivative is followed exactly; that is, the same process steps as well as the same proportions of reactants which are specified in said specific embodiment of the process are used. More specifically, compounds (1) to (5), inclusive, are prepared by condensing commercially-available 2-methylene-1,3,3 - trimethyl-indoline with the following substituted salicylaldehydes, respectively, all of which are either known or which may readily be prepared by those skilled in the art:

(1)
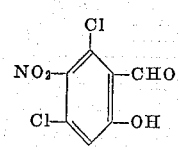
4,6-dichloro-5-nitrosalicylaldehyde (2)
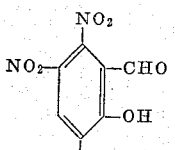
3-methoxy-5,6-dinitrosalicylaldehyde (3)
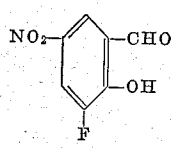
3-fluoro-5-nitrosalicylaldehyde (4)
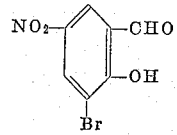
3-bromo-5-nitrosalicylaldehyde (5)
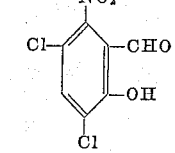
3,5-dichloro-6-nitrosalicylaldehyde As an example of one of the claimed compounds within the limits of the expression, and which has an expression value of 5.19343 according to the sigma values in Table I, is the 5',7'-dichloro, 6'-nitro derivative which has the structure

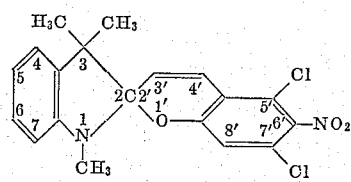

and which expression value of 5.19343 is at the high limit, of those compounds within the expression. This compound in finely divided form is a substantially colorless material, solid in the temperature ranges specified, and forms a colorless solution in toluene which turns to a dark blue when irradiated with light having a preponderance of ultra-violet components, and is reversible in such solution to the colorless state by subsequent irradiation with light having predominately visible or infra-red components.

This 5',7'-dichloro, 6'-nitro derivative is stable in either the colorless or the colored form, at room temperature or lower, and is reversible by the indicated radiation within the temperature range of from plus 20 degrees centigrade to minus 20 degrees centigrade. The compound is stable in either the colored state or the uncolored state even in the presence of color-change-provoking radiation when it is in the undissolved state, such as in dry crystalline form or as an undissolved liquid dispersion. With regard to this particular compound, if a near-saturated solution of it in toluene in the colorless state is changed to the colored form by irradiation with ultra-violet light, part of the colored compound will precipitate out because of a decrease in its solubility. However, upon reversing radiation, the portion remaining dissolved will first change back to the colorless state, allowing the remaining precipitated part to dissolve and become changed to the colorless form on continued reversing radiation.

This 5',7'-dichloro, 6'-nitro derivative compound can be made by adding an aldehyde group to the commercially-available 3,5-dichlorophenol by a Reimer-Tiemann reaction to produce 4,6-dichlorosalicylaldehyde, as follows:

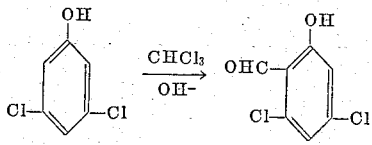

which is carried out specifically as follows:

In a five-liter, three-necked standard round-bottom flask, fitted with a Friedrich condenser, a dropping funnel, a motor-driven stirrer, and a thermometer, are placed 280 grams of calcium hydroxide, 320 grams of sodium carbonate, 142 grams (0.875 mole) of 3,5-dichlorophenol, and 1,500 milliliters of distilled water. With stirring, the mixture is heated to 55 degrees centigrade, after which is added, drop by drop, 209 grams (1.75 moles) of chloroform at a rate to maintain the temperature between 55 degrees and 60 degrees centigrade, over a period of about three hours. The newly-formed yellow mixture then is maintained at 65 degrees to 70 degrees centigrade for three hours, cooled to room temperature (22 degrees centigrade), and acidified to pH 2 with concentrated hydrochloric acid. The foregoing acidified mixture then is steam-distilled directly from the reaction flask until the distillate is no longer cloudy. Six liters of the distillate are collected and allowed to stand for four hours at room temperature. This yields a pale-yellow crystalline precipitate, which is recovered on a suction filter and air-dried to give 50.1 grams (30%) of 4,6-dichlorosalicylaldehyde.

The 4,6-dichlorosalicylaldehyde then is nitrated by the following reaction:

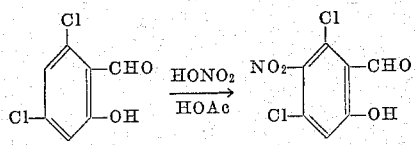

which is carried out specifically as follows:

A solution of 10 grams (0.053 mole) of 4,6-dichlorosalicylaldehyde in 25 milliliters of glacial acetic acid is cooled in a water bath to 18 degrees centigrade, with stirring. Over a period of thirty minutes, 10 milliliters (0.215 mole) of fuming nitric acid, minimum of 90% nitric acid, is added. The temperature is gradually raised to 45 degrees centigrade, and then the mixture is poured into 600 milliliters of ice and water. The product is recovered by filtration, washed thoroughly with cold water, and dried. The crude product is recrystallized from ethyl alcohol to give 2.4 grams (20%) of 4,6-dichloro-5-nitrosalicylaldehyde.

This last-recovered material is condensed with the commercially-available 2-methylene-1,3,3-trimethylindoline in ethyl alcohol, according to the following reaction, shown structurally:

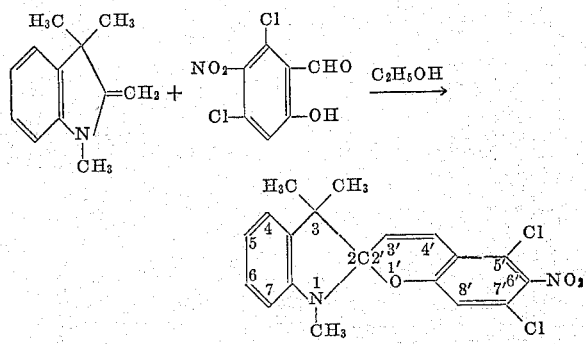

which is carried out specifically as follows:

In a 250-milliliter round-bottom flask fitted with a Friedrich condenser is placed 100 milliliters of absolute ethanol, 3.46 grams (0.02 mole) of 2-methylene-1,3,3-trimethylindoline, and 4.72 grams (0.02 mole) of 4,6-dichloro-5-nitrosalicylaldehyde. The resulting purple solution is refluxed for two hours and then cooled in an ice bath to produce a crystalline precipitate. The crystalline product is recovered by filtration, washed in cold ethanol, and air-dried. The yielded product is 1,3,3-trimethylindoline-5',7'-dichloro-6'-nitrobenzopyrylospiran, which by combustion analysis calculated for $C_{19}H_{16}N_2O_3Cl_2$: C, 58.3%; H, 4.1%. Found: C, 58.2%; H, 4.0%.

The newly-synthesized compound may have some molecules wherein the 2'-1' bond is broken and some in which such bond is intact, depending on the solvent liquid in which the reaction is carried out. Polar solvents tend to favor the colored state, in which the 2'-1' bond is broken, and non-polar solvents tend to favor the colorless state, in which the 2'-1' bond is intact.

The compound may be changed to the all-colored or the all-colorless state by being irradiated in solution with the selected radiation. The color of the colored form dissolved in various solvents may differ; for instance, the compound dissolved in toluene is blue, but dissolved in ethanol is red.

As contrasted with the 5',7' dichloro 6'-nitro compound just discussed, the 6',8' dinitro derivative compound has an expression value of 5.377+, which is outside the acceptable range as defined by the expression. This 6',8' dinitro compound, while having, in solution, a colorless state which may be induced by the mentioned visible and infra-red components specially directed on it, spontaneously reverts to the colored form, at room temperature, by thermal activity, in the absence of special radiation.

For derivatives not satisfying the expression by being below the lower end of the range may be considered the 6'-nitro derivative compound, which has an expression value of 2.64957. This compound is changed to the colored form by ultra-violet radiation at room temperature, reverts spontaneously to the colorless form in the dark, and, hence, is entirely useless for the purposes named.

Next will be described the compound

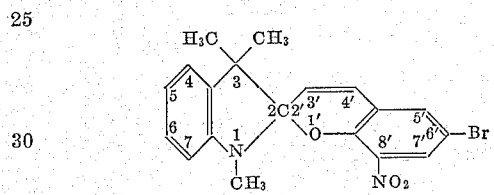

which has an expression value of 3.2326+ and is within the expression range but near its lower end point of 3.110. This compound is made by the nitration of 5-bromosalicylaldehyde, a commercially-available compound, and condensing it with 2-methylene-1,3,3-trimethylindoline, before mentioned, by the same process before described. This compound dissolved in ethanol is colorless when the 2'-1' bond is intact and has a red color when the 2'-1' bond is broken, by the described radiation, and is thermally stable in either condition within the specified temperature range.

All of the derivate compounds included within the terms of the expression may be made by condensing 2-methylene-1,3,3-trimethylindoline with salicylaldehyde having the selected substituents from Table I, in the described manner. The substituted components of the condensation may be made as noted herein or by procedures well known to those familiar with the art.

In selecting substituents from Table I, care should be taken to include in the same compound only substituents which are sterically compatible in the sense that they will not interfere with that resonance in the compound necessary to produce color when the 2'-1' bond is broken.

The following list includes a number of compounds within the expression and having sterically compatible substituents, together with their total sigma values and their expression values, the colored form being red when dissolved in ethanol and dark blue when dissolved in toluene:

|  | $\sum_{5' \leq q \leq 8'} \sigma(Ri, q)$ | Expression value |
|---|---|---|
| 6'-nitro-5',7'-dichloro | 1.523 | 5.19343 |
| 6'-nitro-7',8'-dichloro | 1.350 | 4.60350 |
| 5',6',8'-trichloro-7'-nitro | 1.347 | 4.59327 |
| 6'-nitro-8'-carbomethoxy | 1.227 | 4.18407 |
| 6'-nitro-7'-chloro | 1.150 | 3.92150 |
| 5'-6'-dinitro-8'-methoxy | 1.049 | 3.57709 |
| 6'-nitro-8'-fluoro | 1.017 | 3.46797 |
| 6'-nitro-8'-iodo | .987 | 3.36567 |
| 6'-nitro-8'-bromo | .987 | 3.36567 |
| 5'-nitro-6',8'-dichloro | .974 | 3.32134 |
| 6'-bromo-8'-nitro | .948 | 3.23268 |
| 6'-iodo-8'-nitro | .932 | 3.17812 |
| 6'-chloro-8'-nitro | .912 | 3.10992 |

The thermal stability of the novel compounds of this invention may be quantitatively determined by measuring the half-life of solutions of said compounds, such as ethanol solutions thereof, while taking care that such solutions are maintained at constant temperature, such as 6 degrees centigrade, and are protected from exposure to electromagnetic radiation. Methods for determining the half-life are well known and commonly involve the estimation of the decrease in absorbency of the compound solution by means of a spectrophotometer.

The value of the half-life so obtained is a quantitative measure of the time required for one-half of the molecules in the visibly-colored form to revert to the visibly-colorless form, the solution being in the dark and maintained at a fixed temperature.

The surprisingly and unexpectedly long half-lives of representative compounds selected from the high, medium, and low range of expression values listed above appear in the following table:

| Derivative of 1,3,3-trimethyl-spiro-(2'H-1'-benzopyran-2,2'-indoline) | 6'-NO$_2$-5',7'-Cl | 5',6'-NO$_2$-8'-OCH$_3$ | 6'-NO$_2$-8'-F | 6'-NO$_2$-8'-Br | 5'-NO$_2$-6',8'-Cl |
|---|---|---|---|---|---|
| Half-life | Days 20.5 | Days 34.2 | Min. 1,800 | Min. 3,100 | Min. 2,080 |

By way of comparison, the half-life of the 6'-NO$_2$ derivative, heretofore mentioned, is only 268 minutes. Thus, it is apparent that some of the compounds described and claimed herein are nearly 200 times more stable to thermally-induced color change than the 6'-NO$_2$ derivative.

As an indication of the utility of these compounds, a liquid solution of any one of them, or a mixture of any of them in liquid solution, may be dissolved in toluene, emulsified in a gelable colloid solution as microscopic droplets, and each droplet surrounded by an enclosing wall of the colloid gelled to a solid, to form a solid-walled microscopic capsule containing in liquid form a droplet of the solution. This encapsulation may be accomplished according to the coacervation process described in United States Letters Patent No. 2,800,457, which issued on the application of Barrett K. Green and Lowell Schleicher on July 23, 1957. As an example of forming the tiny capsules, a sol is made of 20 grams of gum arabic dissolved in 160 grams of water. Into this is emulsified 80 grams of the toluene solution containing the selected light-sensitive compound. A second sol of 20 grams of pork-skin gelatin, having its iso-electric point at pH 8, and 160 grams of water is prepared, and this second sol is mixed with the emulsion. A volume of water then is added slowly to the mixture drop by drop, or by spray, with constant stirring until coacervation starts and is continued until the particle size of the toluene droplets on which the coacervate material is deposited is as large as desired, the less water used the smaller the particle size. All of the foregoing steps are carried out with the ingredients at 50 degrees centigrade. The resulting coacervate mixture is poured into water at 0 degrees centigrade, enough water being used to bring the total weight of ingredients to 3960 grams. The mixture is agitated and thereafter is allowed to stand for an hour at not over 25 degrees centigrade. The formation of the capsules is now completed, and they may be used in suspension as a coating for surfaces or for other use as a fluid, or they may be dried and comminuted.

The capsules so made may be coated on a sheet of paper and dried. This sheet may be used to record data by applying ultra-violet light to selected spots thereon to produce a blue mark against the background color of the paper. Such marks may be sensed by photo-electric pick-up means. When the user is through with the data, the marks may be erased with light which changes the novel compound material to the uncolored form, as described. The marks so made are substantially stable thermally at room temperature and below, and, because the capsules retain the novel material in liquid solution, the sheet may be erased and re-marked many times. In addition, the capsules may be broken by pressure to evaporate the toluene and leave the novel compound material in solid form to make any marks made permanent even if irradiated with erasing radiation.

The novel material claimed has many other uses, as in indicator and light-filtering applications wherein the color change brought about by incident light is to be thermally stable.

What is claimed is:
1. A compound of the formula

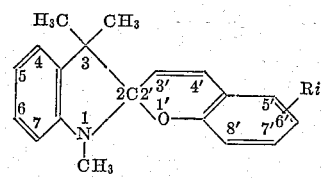

wherein R$i$ is at least two members independently selected from the class consisting of —NO$_2$, —OCH$_3$, —Cl, —Br, —I, and —F; said independently selected members consisting of:
(a) at least one but no more than two —NO$_2$ groups and,
(b) at least one member from said class other than the —NO$_2$ group,
said members being so selected that the compound, when dissolved in ethanol, satisfies the expression:

$$3.10992 \leq 3.41 \sum_{5' \leq q \leq 8'} \sigma(Ri, q) \leq 5.19343$$

wherein R$i$ represents the selected class members, $q$ stands for the ring positions to which such members are attached, and $$\sum_{5' \leq q \leq 8'} \sigma(Ri, q)$$

represents the sum of the substituent constant sigma values of said selected members when attached at independently selected 5', 6', 7', and 8' ring positions, and wherein said values are as follows:

| R$i$ | 8' | 5':7' | 6' |
|---|---|---|---|
| —NO$_2$ | +0.80 | +0.662 | +0.777 |
| —OCH$_3$ | −0.39 | −0.0465 | −0.764 |
| —Cl | +0.20 | +0.373 | +0.112 |
| —Br | +0.21 | +0.391 | +0.148 |
| —I | +0.21 | +0.352 | +0.132 |
| —F | +0.24 | +0.337 | −0.0714 |

2. The compound 1,3,3-trimethylindoline-5',7'-dichloro-6'-nitrobenzopyrylospiran.

3. The compound 1,3,3-trimethylindoline-8'-methoxy-5',6'-dinitrobenzopyrylospiran.

4. The compound 1,3,3-trimethylindolino-8'-fluoro-6'-nitrobenzopyrylospiran.

5. The compound 1,3,3-trimethylindolino-8'-bromo-6'-nitrobenzopyrylospiran.

6. The compound 1,3,3-trimethylindolino-6',8'-chloro-5'-nitrobenzopyrylospiran.

References Cited in the file of this patent

UNITED STATES PATENTS 2,953,454   Berman   Sept. 20, 1960

(Other references on following page)

OTHER REFERENCES

Wizinger et al.: Helvetica Chimica Acta, volume 23, pages 247–271 (1940).

Koelsch et al.: J. Amer. Chem. Soc., volume 74, pages 6288–9 (1952).

Claude et al.: Compt. Rendus, volume 236, pages 697–699 (1953).

Hirshberg et al.: J. Chem. Soc. (London), pages 3129–37 (1954).

Hirshberg: J. Amer. Chem. Soc., volume 78, pages 2304–12 (1956).

Berman et al.: J. Amer. Chem. Soc., volume 81, pages 5605–5608 (1959).